United States Patent
Johnson

[15] 3,660,923
[45] May 9, 1972

[54] FISHING DEVICE, ESPECIALLY FOR ICE FISHING

[72] Inventor: Ronald R. Johnson, 6438 Walker Drive Air Park West, Lincoln, Nebr. 68524

[22] Filed: Oct. 20, 1970

[21] Appl. No.: 82,318

[52] U.S. Cl. ................................................43/17
[51] Int. Cl. ........................................A01k 97/12
[58] Field of Search ..............................43/17, 16

[56] References Cited

UNITED STATES PATENTS

| | | | |
|---|---|---|---|
| D196,888 | 11/1963 | Pilsner | 43/17 X |
| 518,013 | 4/1894 | Thayer | 43/17 |
| 1,571,603 | 2/1926 | Ruggles | 43/16 |
| 3,423,867 | 1/1969 | Bartletti | 43/17 |

FOREIGN PATENTS OR APPLICATIONS

| | | | |
|---|---|---|---|
| 112,983 | 1/1945 | Sweden | 43/17 |
| 221,387 | 7/1968 | Sweden | 43/17 |

Primary Examiner—Samuel Koren
Assistant Examiner—Daniel J. Leach
Attorney—Gene D. Watson

[57] ABSTRACT

A tip-up type fishing device, primarily for ice fishing, includes a platform-like body member provided with adjustable legs for supporting it generally horizontally. A spool wound with fishing line is fixedly mounted on the bottom of the platform. A signaling device, in the form of an elongate spring member, normally projects upwardly from the platform, and is adapted to be set by being flexed into a bowed configuration with its free end bearing against a cocking member projecting from the upper surface of the platform. In use, a desired length of fishing line is unwound from the spool, and then a portion thereof is trained around the cocking member. The signaling spring is then flexibly bowed into position against the cocking member, and the looped portion of the line is removed from behind the cocking member and placed against the spring immediately adjacent its engagement with the cocking member. The remainder of the line passes down through the usual hole in the ice. A slight tug on the line by a fish pulls the looped portion away from the spring and cocking member, and the line moves freely from the spool. The initial tug on the line simultaneously frees the spring signaling device to be noticed by the fisherman. The legs and the spring are movable into generally parallel positions with the platform for carrying and storing.

12 Claims, 7 Drawing Figures

PATENTED MAY 9 1972 3,660,923
SHEET 1 OF 2
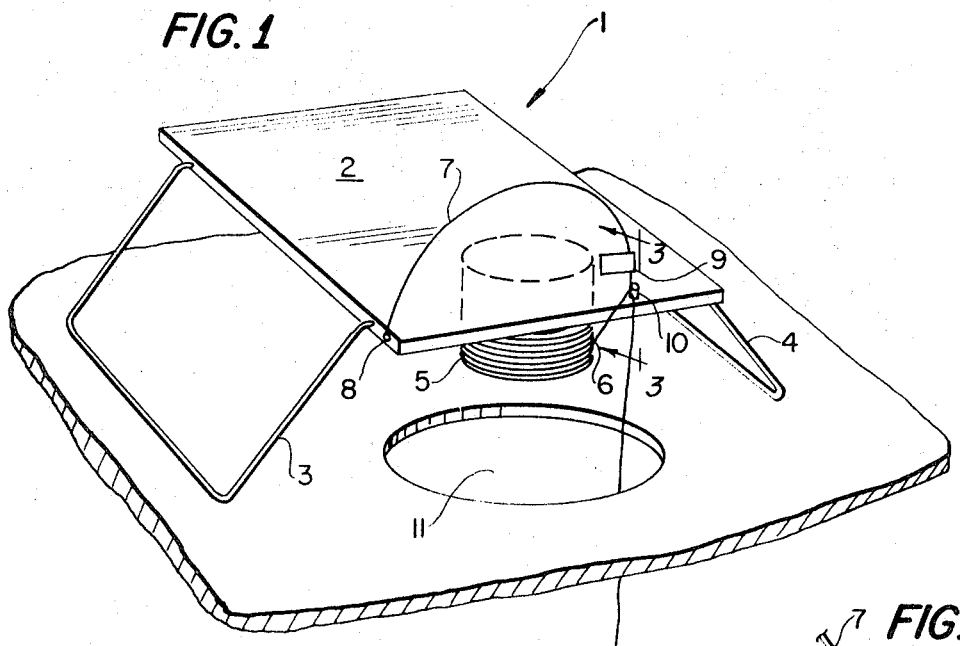
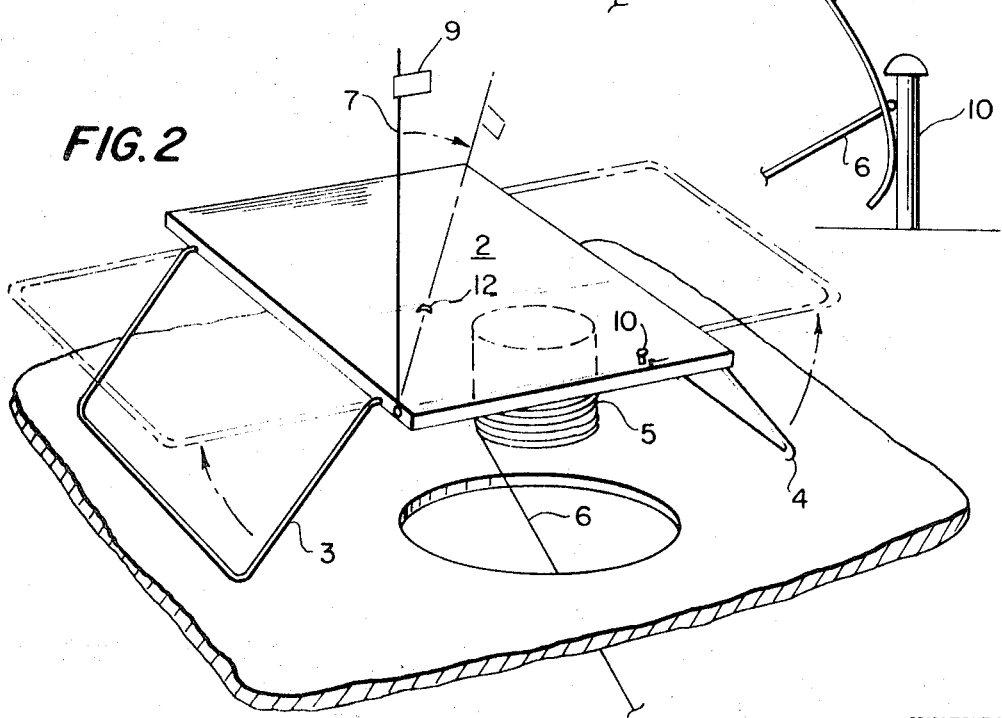
INVENTOR
RONALD R. JOHNSON
BY *Gene D. Watson*
ATTORNEY

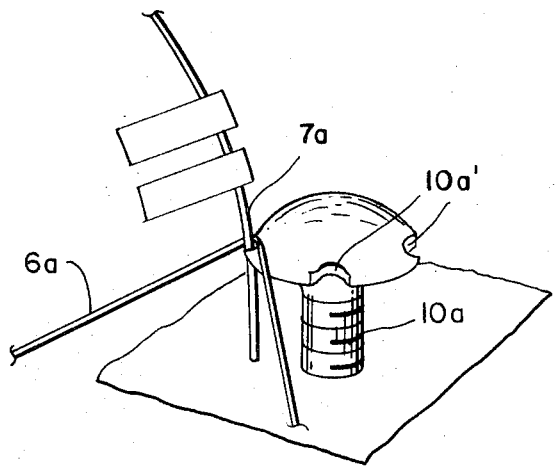
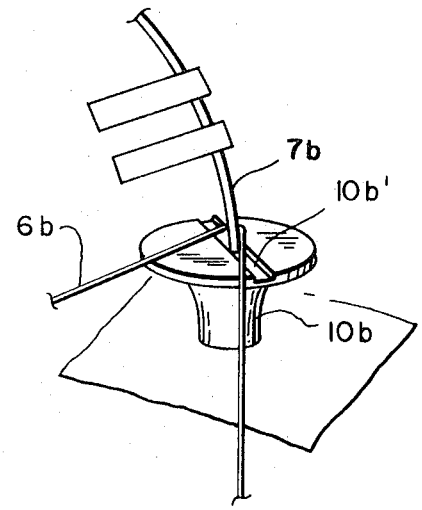
FIG. 4    FIG. 5
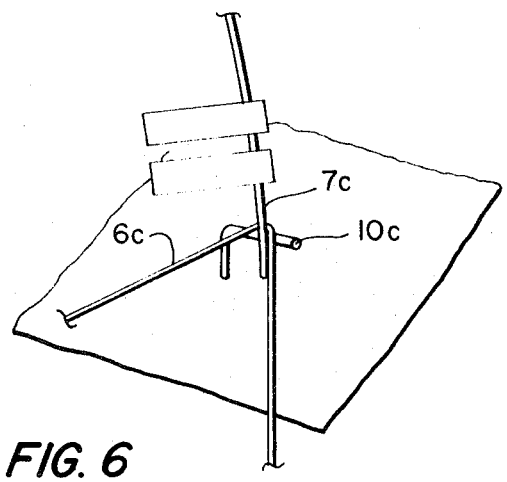
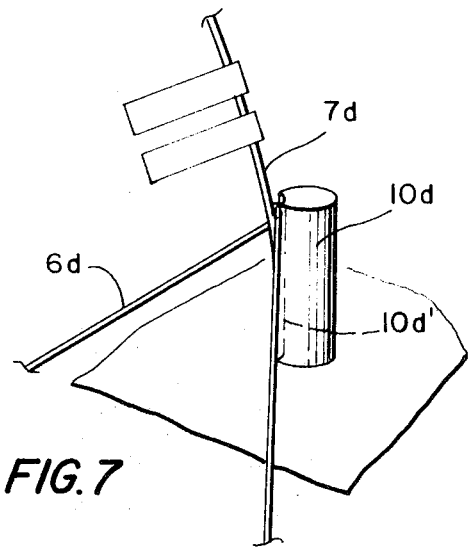
FIG. 6    FIG. 7
INVENTOR
RONALD R. JOHNSON
BY *Gene D. Watson*
ATTORNEY

FISHING DEVICE, ESPECIALLY FOR ICE FISHING

FIELD OF THE INVENTION

This invention relates to fishing devices, primarily ice fishing devices, of the tip-up or signaling type. More particularly, it relates to such a device which utilizes a spinning reel technique in ice fishing.

BACKGROUND AND SUMMARY OF THE INVENTION

Because of the popularity of ice fishing, numerous forms of apparatus have been devised for use by the ice fisherman. Practically all such devices, indeed in common with the instant invention, incorporate some type of signaling arrangement for attracting the attention of the fisherman when the line is taken, or about to be taken, by a fish. This permits a single fisherman to simultaneously fish a number of holes in the ice. While perhaps all of these devices have achieved their purposes with some measure of success, there also have been some problems associated with probably all of them. Thus, those that involve insertion in the water are subject to malfunction because of freezing, as are those that employ moving parts. Many of these devices are not as sensitive as fishermen would prefer, considering the fact that fish generally are more sluggish in winter than during the other seasons and do not take the bait nearly as eagerly, but instead often tending to nibble lightly at the bait, or perhaps trying to swim away with the bait without completely taking it. If substantial resistance is encountered while they are thus nibbling or swimming with the bait, they often seem to become disinterested, and forget the whole thing. It is extremely important to give the fish sufficient time and encouragement to take the bait completely, but still to give the fisherman ample warning that there is some activity at one of his stations, so that he can respond and set the hook at the appropriate time, rather than merely hoping that the fish will catch itself. I have found that devices employing rotating reels generally are not as sensitive as I, along with many other fisherman, would prefer. While there have been attempts to incorporate the spinning reel technique in ice fishing apparatus, I consider these prior attempts, of which I am aware, to be not as advantageous as my invention. Examples of these prior developments are shown in U.S. Pat. No. 2,772,503, issued Dec. 4, 1956, and U.S. Pat. No. 3,378,945, issued Apr. 23, 1968. The former of these does not fully achieve what I consider to be the spinning technique in that the line cannot pay out freely. The latter of these employs moving parts, thus involving the problems inherent in most such devices employing moving parts, and at the same time not achieving the sensitivity which I consider to be important.

Among other prior art devices of which I am aware are the following U.S. Pat. Nos. 3,196,570, issued July 27, 1965; 2,934,849, issued May 3, 1960; 3,190,026, issued June 22, 1965; 3,056,227, issued Oct. 2, 1962; 3,387,401, issued June 11, 1968; and 3,041,770, issued July 3, 1962. I consider my invention, although not as sophisticated and complicated as many of these devices, to be a definite improvement thereover.

Basically, it is an object of this invention to provide a fishing device, particularly for ice fishing, which is sufficiently sensitive to catch all species of fish, including the smaller pan fish, and hence, which is sensitive to the weakest pull of sluggish winter fish. Among the important features of the invention are: its substantially windproof character; the extreme ease with which it will pay out line after being tripped by even the weakest pull; the absence of moving parts; the ease with which it may be stored, carried, and set up; and the extreme simplicity and economy involved in its manufacture.

In general, a fishing device in accordance with my invention incorporates a body member adapted to be supported above a surface, such as ice. A spool-like member having fishing line wound thereon is mounted on the body member such that line can be pulled freely downwardly therefrom without any rotation of the spool when the body member is supported above the surface. An elongate spring member is mounted at one of its ends on the body member and resiliently biased to stand outwardly therefrom in its unflexed condition. A cocking member, preferably in the form of a projecting member, is located on the body member and spaced from the spool and the mounted end of the elongate spring member such that line from the spool-like member can be trained tangentially therefrom to and around the cocking member, and then ultimately downwardly into the ice hole. The length of the elongate spring member relative to its distance from the cocking member is such that it can be flexed into a bowed configuration, with its free end bearing against the cocking member so as to be retained in the flexed bowed condition so long as the free end is not caused to slip from the cocking member. In use, the body member is supported above an opening in the ice, and a selected length of line is unwound from the spool-like member and trained therefrom around the cocking member, and then downwardly through the hole. The spring member is then flexed into its set position, whereafter the line is removed from behind the cocking member and rested upon and/or between the spring member and the cocking member at their point of contact, whereby a downward pull on the end of the line will pull the line completely between and past the point of contact between the spring member and the cocking member, and then freely from the spool-like member, simultaneously releasing the spring member from its set condition.

Other and further objects, features and advantages of the invention will become apparent from the ensuing description of a preferred embodiment, taken in conjunction with the accompanying drawings.

BRIEF DESCRIPTION OF THE DRAWINGS

FIG. 1 is generally a perspective view of a preferred embodiment of the invention shown in its set position.

FIG. 2 is a view corresponding to FIG. 1, but showing the device in its released position, and also showing in broken lines the stowable positions of the signaling spring and the supporting legs.

FIG. 3 is an enlarged detailed view of the cocking member, the signaling spring, and the looped portion of the line, in the set or cocked condition, as viewed generally from position 3—3 in FIG. 1.

FIGS. 4–7 are fragmentary perspective views of alternative cocking members and cocking arrangements.

DESCRIPTION OF THE PREFERRED EMBODIMENT

In the drawings, the entire device is indicated generally by reference character 1. As shown, the device comprises a body member or platform 2, with supporting legs 3 and 4 connected thereto in any convenient manner. These supporting legs preferably are of soft aluminum, or some similar metal, so as to be relatively easily bendable. A spool 5 is mounted on the undersurface of the platform 2 in any convenient manner, since the spool is not rotatable. The spool is wound with a convenient amount of fishing line 6, which is shown as ultimately passing through a hole 11 in the supporting ice. A signaling spring 7, which preferably carries a flag 9 at its free end, is connected to the platform 2 at 8 in any convenient manner, such as by a screw passing through an eye in one end of the spring member 7. A cocking member 10, which conveniently can be merely a screw, projects from the upper surface of the platform 2 as shown. The cocking member may, of course, be of any of several workable forms.

The use of the device is best characterized by its simplicity. Since the device probably will be taken from storage, the legs 3 and 4 normally will be in the broken line position shown in FIG. 2, so as to facilitate stacking and carrying of the device. The signaling spring normally will be in its stowed configuration as shown in broken lines in FIG. 2, whereby it is held against the upper surface of the platform 2 by securing member 12, which may be any kind of hook, or even merely a bent-over nail. To use the device, the platform can be placed over one knee, with the spool 5 down, and legs 3 and 4 can be bent downwardly to support the platform 2 at the desired height. The device is placed over the hole, and sufficient line is run off into the hole so as to place the hook and bait (not shown) at the desired depth. When the proper length of line is unwound, the upper portion of the unwound line is then trained around the cocking member 10, in which condition further line cannot be unwound from the spool by pulling it around the cocking member. Next, spring 7 is released from its secured position, and flexed into the bowed configuration shown in FIG. 1, whereby its free end bears against cocking member 10, as shown in exemplary detail in FIG. 3. Finally, the line is lifted from behind the cocking member 10, and placed between the cocking member 10 and the spring 7, immediately adjacent the point of engagement of these two members. The device is now fully set. Even a slight pull on the line by a fish will trip spring 7 from its set position, and permit it to spring up as a signal. At the same time, the loop of line passing from reel 5 to cocking member 10 is no longer held in position, and thus is free to fall in the water. The remaining line on the spool is also now freely movable downwardly, and in fact can be made to almost fall freely from the spool into the water if no rim or only a small rim is formed on the lower end of the spool. I find this to be preferable, since the almost freely falling line completely frees the fish to move about as he prepares to swallow the bait, limited only by the total length of line attached to and wound onto the spool. The fisherman will, of course, respond to the flag signal so as to attend to the further details at the appropriate time. Thereafter, apart from removing the fish, he need only rewind the line on the spool, and train it around the cocking screw 10 while he attends to any necessary rebaiting of the hook, or the hook may be rebaited while the line is lying on the ice before it is rewound on the spool and trained around the cocking screw.

It will be noted from FIGS. 1 and 3 that the loop of line 6 which passes around the spring 7 in the set position is so oriented as to require only a very slight downward pull on the line to dislodge the spring from the cocking member. Thus, as viewed in FIG. 3, a downward pull on the line would pull the line toward the reader and also downwardly, thus moving the spring toward the reader by the slight distance needed to dislodge it and at the same time moving the loop of line downwardly so as to avoid any possibility of it being caught by the spring as the spring moves to its signaling position. Preferably, as illustrated in FIG. 3, the end of the spring is curved away from the cocking member 10 and the loop of line, thus avoiding any tendency to hook the line as the spring moved upwardly. Also, it should be noted that in the preferred embodiment a straight path between the mounted end 8 of the spring and the cocking member 10 would intersect the cocking member 10 at a portion of its periphery which is not engaged by the fishing line when the line is looped about the cocking member, this arrangement thus avoiding any interference between the line loop and the end of the spring during setting of the spring against the cocking member, and also facilitating removal of the loop of line from behind the cocking member 10 to its set position between the spring and the cocking member. However, these members need not be oriented exactly as shown, but could occupy numerous other positions on the body member 2. Also, although the loop of line passing from the spool to the cocking member 10 is shown as passing around and over the edge of the body member 2, a groove or opening could be formed in the body member 2 adjacent the cocking member 10 through which the loop of line could be passed, the operation otherwise being the same as in the preferred embodiment. The important operational features of the invention are its ease of setting, the sensitivity of the signaling apparatus, and the free movement of the line from the spool after the device is released, and various alternative arrangements could be adapted to utilize these operational concepts of the invention.

Although I have shown in FIG. 3 the spring member bearing against the shank of the cocking member, in many (if not most) instances, the spring member would bear against the edge of the head of the cocking member, and the line would bear against the head of the cocking member and the spring member, requiring a stronger pull to dislodge the line and release the spring member.

In an embodiment that has been successful in use, the body member 2 is in the form of a wood block having a top surface area of approximately 4½ inches by 5½ inches, and the legs are of soft aluminum metal and extend outwardly from the body by approximately 6 inches. The flag spring 5 can be a round or strip member of any suitable resilient metal, and may in fact be a coil spring of small diameter.

The device normally would be used with any of several conventional hole heaters to avoid freeze problems in cold weather, as is well known.

To lessen the possibility of wind dislodging the spring member, the flag or flags preferably may be rotatably or pivotally mounted on the spring member so as to respond to wind much in the manner of a wind vane by aligning with the wind direction.

Referring now to the alternative arrangements illustrated in FIGS. 4–7, the cocking member 10a of FIG. 4 is in the form of a threaded member such as a wood screw or bolt, and has a plurality of notches 10a' of different depths formed in the perimeter of its head. The cocking member thus can be rotated to bring a deeper or shallower notch into cocking position so as to provide a stiffer or less stiff setting of the spring 7a in the selected notch. Member 10a, of course, need not be threaded, but can be otherwise rotatably mounted on the device. As in the previous embodiment, the line 6a in the cocked position passes around the member 7a such that a pull on the line will dislodge the signaling member. The primary advantage of the embodiment of FIG. 4 is that the stiffness of the cocked setting can be selected in accordance with wind conditions so as to prevent accidental dislodging of the signaling device by the wind.

In the embodiment of FIG. 5, the signaling member 7b rests in a slot 10b' formed in cocking member 10b, to be pulled out of the slot by the line 6b.

In the embodiment of FIG. 6, the cocking member 10c is in the general form of a hook, and provides a convenient surface against which the signaling member 7c bears when in the cocked position.

In the embodiment of FIG. 7, the signaling member 7d, in the cocked position, has its end resting in a vertical groove 10d' in cocking member 10d, to be dislodged therefrom by a pull on the line 6b.

The methods of operation of the embodiments of FIGS. 4–7 will be readily apparent. However, it should be noted that the most desirable characteristic of the embodiment of FIG. 4 is its versatility. By resting the signaling member or spring member 7a against the cocking member 10a with the notches 10a' of different depths, any degree of stiffness can be obtained by merely dialing or turning the cocking member to the desired type of setting. For instance, if a strong wind is blowing, a fairly deep notch can be used. If it is a calm day and the angler wishes to fish for pan fish, the shallowest notch should be used. If the fisherman is using large minnows, he would want a fairly stiff setting such that the bait would not give the angler a false signal.

Having described a preferred embodiment of my invention in the manner required by the statutes, I claim:

1. A fishing device comprising a main body member, means for supporting said body member above a surface, a spool-like member having fishing line wound thereon, said spool-like member being mounted on said main body member such that line can be pulled freely downwardly therefrom without any rotation of said spool-like member when said body member is supported above the surface by said supporting means, an elongate spring member mounted at one of its ends on said body member and resiliently biased to stand outwardly therefrom in its unflexed condition, a cocking member in the form of a projecting member located on said body member and spaced from said spool-like member and the mounted end of said elongate spring member such that line from said spool-like member can be trained around said cocking member and then ultimately downwardly, but cannot be unwound from said spool-like member by pulling toward or around said cocking member, and such that said elongate spring member can be flexedly bowed so as to have its free end bear against said cocking member so as to be retained in said flexed bowed condition so long as said free end is not caused to slip from said cocking member, whereby in use said body member can be supported upon an over-water surface above an opening therein, a selected length of line unwound from said spool-like member and trained therefrom around said cocking member and then downwardly through the hole, said spring member then flexedly bowed to have its free end bear against said cocking member, said line removed from behind said cocking member and rested upon said spring member and said cocking member at their point of contact, and the remainder of said line permitted to pass downwardly through the opening in said over-water surface, whereby a downward pull on the end of the line will pull said line completely between and past the point of contact between said spring member and said cocking member and then freely from said spool-like member, simultaneously releasing said spring member from its flexedly bowed condition.

2. A fishing device as claimed in claim 1 wherein line trained from said spool-like member tautly about said cocking member and then downwardly therefrom engages only a portion of the periphery of said cocking member, and said mounted end of said spring member and said cocking member are so located relative to each other that a straight path extending between the two would meet the periphery of the cocking member at a point thereon not engaged by said line, and wherein line trained from the spool-like member about the cocking member would pass between the mounted end of said spring member and said cocking member.

3. A fishing device as claimed in claim 1 wherein said main body member comprises a platform-like member, and said means for supporting said body member comprise legs for supporting the platform-like member generally horizontally.

4. A fishing device as claimed in claim 3 wherein said legs are adjustable between their supporting positions in which they extend generally downwardly from the platform-like member, and stowed positions in which they extend generally parallel to said platform-like member.

5. A fishing device as claimed in claim 4 wherein said legs are of easily bendable metal and are rigidly attached at their ends to said platform-like member, and are adjustable by bending adjacent their attached ends.

6. A fishing device as claimed in claim 3 wherein said spool-like member is mounted on the lower surface of said platform-like member, and said spring member and said cocking member are mounted so as to project upwardly above the upper surface thereof.

7. A fishing device as claimed in claim 6 wherein said cocking member is a screw mounted in the upper surface of said platform-like member.

8. A fishing device as claimed in claim 1 wherein said cocking member is of generally cylindrical form and projects upwardly from the upper surface of said platform-like member.

9. A fishing device as claimed in claim 1 wherein said main body member comprises a generally rectangular platform, and said mounted end of said spring member and said cocking member are mounted closely adjacent one edge thereof.

10. A fishing device as claimed in claim 9 further comprising means for detachably securing said spring member along the upper surface of said platform when not in use.

11. A fishing device as claimed in claim 1 wherein said cocking member is formed with at least one concavity located to releasably receive the free end of said elongate spring member in the flexedly bowed position thereof.

12. A fishing device as claimed in claim 11 wherein said cocking member is formed with a plurality of said concavities, each of different depths, spaced about its perimeter, and wherein said cocking member is rotatable so as to bring any selected concavity into position to releasable receive the free end of said elongate spring member.

* * * * *